US006096213A

United States Patent [19]

Radovanovic et al.

[11] Patent Number: 6,096,213

[45] Date of Patent: Aug. 1, 2000

[54] PUNCTURE-RESISTANT POLYOLEFIN MEMBRANES

[75] Inventors: Philip D. Radovanovic, Minneapolis; Scott D. Thomas, Woodbury, both of Minn.

[73] Assignee: 3M Innovative Properties Company, St. Paul, Minn.

[21] Appl. No.: 09/134,142

[22] Filed: Aug. 14, 1998

[51] Int. Cl.[7] .................................................... B01D 71/06

[52] U.S. Cl. ............................... 210/500.36; 210/500.27; 210/500.42; 264/41; 264/48; 428/319.3

[58] Field of Search ......................... 210/500.36, 500.42, 210/490, 500.27, 500.23; 264/41.48, 210.6, 290.2; 428/220, 333, 319.3

[56] References Cited

U.S. PATENT DOCUMENTS

| | | | |
|---|---|---|---|
| 4,247,498 | 1/1981 | Castro | 264/41 |
| 4,539,256 | 9/1985 | Shipman | 428/315.5 |
| 4,726,989 | 2/1988 | Mrozinski | 428/315.5 |
| 4,867,881 | 9/1989 | Kinzer | 210/490 |
| 5,051,183 | 9/1991 | Takita et al. | 210/500.36 |
| 5,238,623 | 8/1993 | Mrozinski | 264/48 |
| 5,683,634 | 11/1997 | Fujii et al. | 264/41 |
| 5,759,678 | 6/1998 | Fujii et al. | 210/500.36 |
| 5,772,884 | 6/1998 | Tanaka et al. | 210/500.36 |
| 5,882,518 | 3/1999 | Yagi et al. | 210/500.36 |

FOREIGN PATENT DOCUMENTS

| | | |
|---|---|---|
| 9-169867 | 6/1997 | Japan . |
| WO 97/2088 | 6/1997 | WIPO . |
| WO 97/23554 | 7/1997 | WIPO . |

*Primary Examiner*—Ana Fortuna
*Attorney, Agent, or Firm*—Kent S. Kokko

[57] ABSTRACT

Briefly, in one aspect, the present invention provides puncture resistant microporous materials made of melt-processable semi-crystalline thermoplastic polymers. The microporous materials can be produced at relatively high rates and at low cost. Films and multilayer constructions made of the microporous materials and methods of making microporous materials also are provided.

23 Claims, No Drawings

PUNCTURE-RESISTANT POLYOLEFIN MEMBRANES

FIELD OF THE INVENTION

The present invention relates to puncture-resistant microporous materials (e.g., films and/or membranes). In another aspect the invention relates to articles made from microporous materials and to methods for preparing such materials and articles.

BACKGROUND OF THE INVENTION

Microporous films, sheets, and membranes are materials that have structures which enable fluids to pass readily through them. These materials have pores whose effective size typically is at least several times the mean free path of the flowing molecules, namely from several micrometers down to as low as about 100 Angstroms. Sheets made from the materials generally are opaque, even when made from an originally transparent material, because the surfaces and internal structure scatter visible light.

Microporous membranes enjoy utility in a wide range of divergent applications, including use in the filtration of solid materials, ultrafiltration of colloidal matter, use as diffusion barriers or separators in electrochemical cells and uses in the preparation of synthetic leathers and fabric laminates. The latter requires the membranes to be permeable to water vapor but substantially impermeable to liquid water when used to prepare such articles as shoes, raincoats outer wear, camping equipment, and the like. Microporous membranes also are utilized in the filtration of antibiotics, beers, oils, bacteriological broths, and for the analysis of air, microbiological samples, intravenous fluids and vaccines. Surgical dressings, bandages and other fluid transmissive medical articles likewise incorporate microporous membranes and films. Microporous membranes also are commonly employed as battery separators.

For more particularized applications microporous membranes may be laminated onto other articles to make laminates of specialized utility. Such laminates may include, for example, a microporous layer laminated to an outer shell layer to make a particularly useful garment material. Microporous membranes may also be utilized as a tape backing to provide such products as vapor transmissive wound dressing or hair setting tapes and the like.

A number of methods for making microporous films and membranes are taught in the art. One of the most useful methods involves thermally induced phase separation. Generally such a process is based on the use of a polymer that is soluble in a diluent at an elevated temperature but that is insoluble in the diluent material at a relatively lower temperature. The so-called "phase transition" can involve a solid-liquid phase separation, a liquid-liquid phase separation or a liquid to gel phase transition. Examples of such methods are described in U.S. Pat. Nos. 4,247,498, 4,539,256, 4,726,989, and 4,867,881.

Typically, state-of-the-art processes that employ normally melt-processable polymers produce films and membranes with relatively low puncture resistance. To overcome this limitation for applications where mechanical strength and puncture resistance are desirable, a component of an ultra-high molecular weight polyolefin typically is added to the film or membrane to boost its mechanical integrity and puncture strength. U.S. Pat. No. 5,051,183 (Takita et al.), for example, describes making microporous films having at least one percent by weight of an ultra-high molecular weight polyolefin. While the addition of ultra-high molecular weight materials can favorably address problems of mechanical integrity, blends containing these additions are not normally melt-processable and must further incorporate plasticizers to become melt-processable. Thus use of blends containing such additions generally adds complexity and cost to processing techniques.

SUMMARY OF THE INVENTION

Briefly, in one aspect, the present invention provides puncture resistant microporous materials made of melt-processable semi-crystalline thermoplastic polymers. These microporous materials can be produced at relatively high rates and at low cost. Accordingly, in one aspect, the present invention provides a method of making microporous material, the method comprising:

(a) melt blending to form a substantially homogeneous mixture comprising:
  (i) from about 25 to about 60 parts by weight of a melt-processable, semi-crystalline thermoplastic polymer component; and
  (ii) from about 40 to about 75 parts by weight of a second component comprising either (1) a compound that is miscible with the thermoplastic polymer component at a temperature above the melting temperature of the thermoplastic polymer component but that phase separates from the thermoplastic polymer component when cooled below the crystallization temperature of the thermoplastic polymer component or (2) a compatible liquid that is miscible with the thermoplastic polymer component at a temperature above the liquid-liquid phase separation temperature but that phase separates from the thermoplastic polymer component when cooled;
(b) forming a shaped material of the melt blended mixture;
(c) cooling the shaped material to a temperature at which phase separation occurs between the compound or compatible liquid and the thermoplastic polymer component through either (1) crystallization precipitation of the thermoplastic polymer component or (2) liquid-liquid phase separation; and
(d) stretching the shaped material in at least two perpendicular directions to an area expansion ratio of greater than nine to provide a network of interconnected pores; and
(e) removing the compound or compatible liquid to provide a microporous material having a puncture resistance of at least 350 g/25 microns.

In a second aspect, the invention provides a microporous material comprising a melt-processable, semi-crystalline thermoplastic polymer where the thermoplastic polymer is miscible in a compound or compatible liquid when heated above the melting temperature of the thermoplastic polymer or the liquid-liquid phase separation temperature and phase separates from the compound or compatible liquid when cooled, where the material is stretched in at least two perpendicular directions to an area expansion ratio of greater than nine, and where the material has a puncture resistance of at least 350 g/25 micrometers. Articles, including membranes, films and sheets made of the microporous materials also are described.

DETAILED DESCRIPTION OF PREFERRED EMBODIMENTS

The microporous materials of the invention are made using melt-processable polymers. The melt-processed materials are made microporous by phase separating from the material either (1) a compound that is miscible with the thermoplastic polymer component at a temperature above the melting temperature of the thermoplastic polymer component but that phase separates from the polymer component when cooled below the crystallization temperature of the component or (2) a compatible liquid that is miscible with the thermoplastic polymer component at a temperature above the liquid-liquid phase separation temperature but that phase separates from the polymer when cooled.

The term "normally melt processable" or simply "melt processable" is used herein to refer to polymers that are melt-processable under ordinary melt-processing conditions using conventional extrusion equipment without the need for plasticizer addition.

The term "melting temperature" is used to refer to the temperature at or above which the polymer component in a blend with a compound or a compatible liquid will melt.

The term "crystallization temperature" refers to the temperature at or below which the polymer component in a blend with a compound, will crystallize.

The term "liquid-liquid phase separation temperature" is used to refer to the temperature at or below which a melt of a mixture of a polymer and a compatible liquid, i.e., a homogeneous polymer-melt, phase separates by either binodal or spinodal decomposition.

The term "compatible" or "a compatible mixture" refers to a material capable of forming a fine dispersion (less than 1 micron in particle size) in a continuous matrix of a second material or capable of forming an inter-penetrating polymer network of both materials.

Polymers useful in the present invention are normally melt-processable, and the melt-processability of many common individual polymers can be predicted from melt flow indices. Normally melt-processable polymers are those that have a sufficiently low melt viscosity, i.e., a sufficiently high melt flow index, that they can be extruded through either a single screw extruder or a twin screw extruder without the aid of plasticizing materials. The actual melt flow index that is suitable depends on the type of polymer. Examples of some of the more common polymers of interest are as follows. High density polyethylene, for example, is considered melt-processable if it has a melt flow index above 4 dg/min (ASTM D1238-90b, Condition F, HLMI); and ethylene alpha-olefin copolymer and ethylene vinylalcohol copolymer are considered melt processable if they have a melt flow index above 0.5 dg/min (ASTM D1238-90b, Condition E). Polypropylene is considered melt-processable if it has a melt flow index above 0.2 dg/min (ASTM D1238-90b, Condition 1). Poly(ethylene chlorotrifluoro ethylene) is considered melt-processable if it has a melt flow index above 1.0 dg/min (ASTM D1238-90b, Condition J). Poly(vinylidene fluoride) is considered melt-processable if it has a melt flow index above 0.2 dg/min (ASTM D1238-90b, Condition L). Polymethylpentene is considered melt-processable if it has a melt flow index above 5 dg/min (ASTM D1238-90b, Condition 260 C, 5 kg load). Compatible blends of melt-processable polymers also are melt-processable. In contrast, classes of polymers with melt flow indices far below values considered melt-processable for that polymer class generally are special grades that are not normally melt-processable and must be processed using special techniques, such as ram extrusion, or must be plasticized to enable processing with a conventional extrusion equipment. Processing the polymer grades that are not normally melt-processable with a plasticizer requires longer residence times in the extruder to obtain desirable melt homogeneity and higher concentrations of a compound or compatible liquid in the melt to reduce extruder energy requirements. As a result, equipment productivity is significantly limited, the production costs increased, and dangers of thermal degradation is increased.

Useful polymers also are those that can undergo processing to impart a high biaxial orientation ratio in a manner that enhances their mechanical integrity, and are semi-crystalline in nature. Orienting semi-crystalline polymers significantly improves the strength and elastic modulus in the orientation direction, and orientation of a semicrystalline polymer below its melting point results in extended chain crystals with fewer chain folds and defects. The most effective temperature range for orienting semicrystalline polymers is between the alpha crystallization temperature of the polymer and its melting point. The alpha crystallization temperature (or alpha transition temperature) corresponds to a secondary transition of the polymer at which crystal sub-units can be moved within the larger crystal unit.

Preferred polymers therefore are those that exhibit an alpha transition temperature and include, for example: high density polyethylene, linear low density polyethylene, ethylene alpha-olefin copolymers, polypropylene, poly (vinylidene fluoride), poly(vinyl fluoride), poly(ethylene chlorotrifluoro ethylene), polyoxymethylene, poly(ethylene oxide), ethylene vinylalcohol copolymer, and compatible blends thereof. Blends of one or more "compatible" polymers may also be used in practice of the invention. In case of compatible blends it is not necessary that both components exhibit an alpha crystallization temperature and if liquid-liquid phase separation is used, the minor component in the blend need not to be even semi-crystalline. Particularly preferred polymers have melting temperatures greater than 140° C. (e.g., polypropylene) and blends of such polymers with lower temperature melting polymers.

Miscibility and compatibility of polymers are determined by both thermodynamic and kinetic considerations. Common miscibility predictors for non-polar polymers are differences in solubility parameters or Flory-Huggins interaction parameters. For polymers with non-specific interactions, such as polyolefins, the Flory-Huggins interaction parameter can be calculated by multiplying the square of the solubility parameter difference by the factor (V/RT), where V is the molar volume of the amorphous phase of the repeated unit $V=M/\rho$ (molecular weight/density), R is the gas constant, and T is the absolute temperature. As a result, Flory-Huggins interaction parameter between two non-polar polymers is always a positive number. Thermodynamic considerations require that for complete miscibility of two polymers in the melt, the Flory-Huggins interaction parameter has to be very small (e.g. less than 0.002 to produce a miscible blend starting from 100,000 weight-average molecular weight components at room temperature). It is difficult to find polymer blends with sufficiently low interaction parameters to meet the thermodynamic condition of miscibility over the entire range of compositions. However, industrial experiences suggest that some blends with sufficiently low Flory-Huggins interaction parameters, although still not miscible based on thermodynamic considerations, form compatible blends.

Unlike miscibility, compatibility is difficult to define in terms of exact thermodynamic parameters, since kinetic factors, such as melt processing conditions, degree of mixing, and diffusion rates can also determine the degree of compatibility.

Some examples of compatible polyolefin blends are: high density polyethylene and ethylene alpha-olefin copolymers;

polypropylene and ethylene propylene rubber; polypropylene and ethylene alpha-olefin copolymers; polypropylene and polybutylene.

In the presence of a common diluent or oil component that is miscible with all polymers in a blend above their melting temperatures, the thermodynamic requirements for miscibility relax. Two polymers with a Flory-Huggins interaction parameter that is significantly greater than the critical value for miscibility in a binary system, can still be miscible in a melt comprising a ternary system with a common solvent, at least over a range of compositions.

Compatibility affects the range of useful polymer concentrations when polymer blends are employed. If the polymers are incompatible, that range of compositions can be quite narrow, restricted to very low polymer concentrations, and of minimal practical usefulness in making the inventive articles. However, if polymers are compatible, a common solvent can promote their miscibility into the composition regions of much higher polymer concentrations, thus allowing the use of common processing techniques such as extrusion to make articles of this invention. Under these conditions, all components in the melt are miscible and phase-separate by crystallization precipitation or liquid-liquid mechanism upon cooling below the phase separation temperature. The rate of cooling is quite rapid (preferably sufficient so that the melt-blended solution cools below the phase boundary in 30 seconds or less) and controlled by the process conditions that minimize the size of phase-separated microdomains and provides uniformity on a microscopic level.

Compatibility also affects film uniformity. Cast films that are made from compatible blends by the method of this invention are transparent which confirms the uniformity on a microscopic level. This uniformity is of great importance for successful post-processing: films with a lesser degree of uniformity made from incompatible polymers break easily during stretching. Film uniformity is also important in some applications, such as thermal shutdown battery separators, for which reliable shutdown performance on a microscopic level is desirable.

Materials useful as the second component are those that form a solution with the chosen melt-processable thermoplastic polymer or polymer mixture at an elevated temperature to form a solution but that also permit the components to phase separate when cooled. This second component may sometimes be referred by shorthand simply as the "blending compound" or the "diluent." Useful blending compound materials include (1) those mentioned as useful compounds in Shipman, U.S. Pat. No. 4,539,256, incorporated herein by reference, (2) those mentioned as useful compatible liquids in Kinzer, U.S. Pat. No. 4,867,881, incorporated herein by reference, and (3) additional materials such as, dodecyl alcohol, hexadecyl alcohol, octadecyl alcohol, dicyclohexylphthalate, triphenyl phosphate, paraffin wax, liquid paraffin, stearyl alcohol, o-dichlorobenzene, trichlorobenzene, dibutyl sebacate, and dibenzyl ether.

Compounds suitable to make the microporous material of the invention by crystallization precipitation are liquids or solids at room temperature. These compounds are also materials in which the crystallizable thermoplastic polymer will dissolve to form a solution at a temperature above the melting temperature of the thermoplastic polymer component but that will phase separate on cooling at or below the crystallization temperature of the thermoplastic polymer component. These compounds preferably have a boiling point at atmospheric pressure at least as high as the melting temperature of the thermoplastic polymer. Compounds having lower boiling points may be used in those instances where superatmospheric pressure may be employed to elevate the boiling point of the compound to a temperature at least as high as the melting temperature of the thermoplastic polymer component.

Particularly useful with polypropylene are mineral oil, dioctylphthalate, or mineral spirits. Mineral oil and mineral spirits are examples of mixtures of blending compounds since they are typically blends of hydrocarbon liquids. These are especially useful in some of the polymer mixture of the present invention.

For microporous materials made by liquid-liquid phase separation, a compatible liquid is used to make up the solution in the preparation of the microporous material. The compatible liquid is a liquid or solid material at room temperature that is capable of forming a solution with the thermoplastic polymer when heated above the liquid-liquid phase separation temperature and which phase separates from the polymer by liquid-liquid phase separation, rather than crystallization precipitation, on cooling. The compatibility of the liquid with the thermoplastic polymer can be determined by heating the polymers and the liquid to form a clear homogeneous solution. If a solution of the polymers and the liquid cannot be formed at any liquid concentration, then the liquid is inappropriate for use with those polymers. In practice, the liquid used may include compounds which are solid at room temperature but liquid at the melt temperature of the thermoplastic polymer component.

It will be understood that the operability of a specific liquid with a given thermoplastic polymer cannot be predicted with absolute certainty. Certain guidelines can, however, be set forth. For non-polar thermoplastic polymers, non-polar organic liquids with similar room temperature solubility parameters generally are useful at the solution temperatures. Similarly, polar organic liquids generally are useful with polar polymers. Blends of two or more liquids can be used as the compatible liquid as long as the selected thermoplastic polymer is soluble in the liquid blend at the liquid-liquid phase separation temperature and the solution formed separates by liquid-liquid phase separation on cooling. One component of such compatible blends also can be a non-solvent for a selected polymer as long as it is mixed with at least one effective solvent in amounts sufficient to reduce its solvency and induce, upon cooling, liquid-liquid phase separation instead of crystallization precipitation. When the selected thermoplastic semi-crystalline polymer component is polypropylene, esters such as dibutyl phthalate, ethers such as dibenzyl ether, and blends of mineral oil and non-ionic surfactants such as PEG-400-dilaurate are particularly useful as the compatible liquid.

Where two or more thermoplastic polymers are blended together to form a first polymer component comprising a polymer mixture, the compatible liquid can phase separate from one component of the compatible polymer mixture by liquid-liquid phase mechanism, while phase separating from the other component of the compatible polymer mixture by crystallization precipitation. In that case, hybrid structures form, and these structures can resemble both of the described two structures; i.e., that obtained by crystallization precipitation or liquid-liquid phase separation, respectively. Thus, for example, when a first polymeric component is polypropylene and a second polymeric component is polybutylene, an ester such as dioctyl phthalate is particularly useful to obtain a hybrid structure.

The microporous materials of the invention may also contain, in addition to compounds described above, conventional fillers or additive materials in limited quantity so as not to interfere with the formation of the microporous material, and so as not to result in unwanted exuding of the additive. Such additives may include anti-static materials, dyes, plasticizers, UV absorbers, nucleating agents, anti-oxidants, and the like. The amount of additive is typically less than 10% of the weight of the polymeric mixture, preferably less than 2% by weight.

A melt solution may be prepared by mixing the thermoplastic polymer component and the blending compound under agitation such as that provided by an extruder and heating until the temperature of the mixture is above (1) the melting point of the polymer component, or (2) the liquid-liquid phase separation temperature of the mixture. At this point the mixture becomes a melt solution or single phase.

The melt solution is prepared by mixing the polymer and blending compound or compatible liquid in a continuous mixing device such as an extruder. Preferably, the blending compound is added after the polymer component is melted. Once the melt solution is mixed sufficiently to make a homogeneous melt, it is shaped in a form of a film or a sheet by a flat sheet or film die or by an annular die (as in a blown film line).

Cooling of the shaped article occurs by contacting the shaped material with a casting wheel, a water bath, or with air. Cooling causes the phase separation to occur between the blending component and the thermoplastic polymer component. This may occur either by crystallization precipitation of the polymer component to form a network of polymer domains or by a liquid-liquid phase separation to form cells of a polymer-lean phase. It will be understood that by either method the rate of crystallization must be sufficient to achieve the overall desired number of crystal sites. The crystallization rate is impacted by known processing conditions, and in those cases where the rate of crystallization is excessively slow additional factors must be considered, such as increased heat transfer (i.e., faster quench rate) and/or the addition of nucleating agents.

Sufficient stretching or orientation is needed to achieve improved puncture resistance over what has been known for microporous films made with normally melt processable polymers. The shaped material or film first is stretched biaxially, i.e. along at least two perpendicular directions. To achieve adequate orientation of the semi-crystalline thermoplastic polymer component, the film must be treated to a temperature above the alpha crystallization temperature and must be stretched enough to orient the mobile crystal structures. The most effective temperature range for orienting semicrystalline polymers is between the alpha crystallization temperature of the polymer and its melting point. In the presence of a compound or a compatible liquid that is miscible with a semicrystalline polymer above the melting or liquid-liquid phase separation temperature, the alpha transition temperature may reduce, allowing orientation to be carried out at a temperature below the alpha transition temperature of the pure polymer. Above the alpha crystallization temperature lamellar slip in larger crystal units, such as spherulites, occurs and extended chain crystals form. It is difficult to effectively orient polymers that do not have the alpha transition to any great extent because their crystal segments cannot be easily rearranged into an aligned state. The biaxial stretching may be performed either in sequentially or simultaneously. Sequential stretching is carried out by drawing the films with a length orienter and a tenter (i.e., orienting down-web and cross-web respectively). Simultaneous stretching is carried out by drawing the film in both directions at the same time. Although the degree of stretch may be the same or may be different in each direction, the film preferably is stretched to greater than nine times its original area, preferably at least 15 times, and more preferably at least 25 times. The resulting puncture resistance is at least 350 g/25 $\mu$m, preferably at least 400 g/25 $\mu$m, and more preferably at least 500 g/25 $\mu$m. The shaped material lacks air voids at this stage and achieves air voids through washing.

Microporosity is achieved by removing the blending compound or diluent through a removal step after the biaxial orientation. The removal may be carried out by extraction or by using other known methods.

Generally the pore size and percent void volume of the stretched and washed microporous material are determined by the amount of blending compound or compatible liquid used to make it. Preferably from 40 to 75 parts of a compound or from 40 to 75 parts of a compatible liquid are used per 100 parts of total composition. As less blending compound or compatible liquid is used, the porosity and pore interconnectivity generally decrease. As more blending compound or compatible liquid is used, the porosity and pore interconnectivity generally increase, but mechanical properties (e.g., tensile properties and puncture resistance) generally decrease. Porosity, pore interconnectivity, and mechanical properties are, however, also influenced to some extent by polymer types, component concentration, processing conditions (e.g., quenching rate and/or stretching temperature) and by the presence or absence of a nucleating agent. Thus, judicious selection of polymer materials and concentrations, blending compound or compatible liquid concentrations, and processing conditions will result in desired porosity, pore interconnectivity, and mechanical properties.

The microporous film can be thermally annealed after removal of the blending compound or compatible liquid to achieve improved dimensional stability. Also after the blending compound or compatible liquid has been removed, the microporous material or film may be imbibed with various fillers to provide any of a variety of specific functions, thereby providing unique articles. For example, the imbibing material or filler may be a liquid, solvent solution, solvent dispersion or solid. Such filler may be imbibed by any of a number of known methods which results in the deposition of such fillers within the porous structure of the microporous sheet. Some imbibing materials are merely physically placed within the microporous sheet. In some instances, the use of two or more reactive components as the imbibing materials permits a reaction within the microporous sheet structure. Examples of imbibing material include antistatic agents, surfactants, and solid particulate material such as activated carbon and pigments.

A multi-layer microporous material or film of the present invention may be made employing the above-described microporous material as a layer with at least one additional porous layer. By way of example, in a three-layer system the above-described porous layer is preferably the center layer sandwiched by, i.e., in between the additional porous layers.

The additional porous layers may include the same porous layer above described, namely, the phase-separated polymeric film or may also include a crystallization phase-separated, melt-processible polymer such as described in U.S. Pat. No. 4,539,256, or a porous layer comprising a liquid-liquid phase-separated, melt-processible polymer as described in U.S. Pat. No. 4,867,881.

The additional porous layers may be prepared by melt-blending solutions such as described in U.S. Pat. Nos.

4,539,256 and 4,867,881, the former describing a melt blend solution of a compound with a crystallization phase-separated, melt-processible polymer and the latter describing a melt blend solution of a liquid-liquid phase-separable, melt-processible polymer and a compatible liquid.

The multi-layer film may be formed by coextrusion of the two or more polymer compositions followed by cooling to cause phase separation and then orientation of the multi-layer film to form a porous film structure as previously described. The coextrusion may employ a feedblock or a multi-manifold die. The multi-layer film may alternatively be made by laminating one or more of the layers together.

The microporous materials or multi-layer films of the present invention may be employed in any of a wide variety of situations wherein microporous structures may be utilized. They find particular utility as battery separators.

EXAMPLES

Test Methods

Gurley Air Flow:

Gurley air flow is a measurement of time in seconds required to pass 10 cc of air through a film according to ASTM D 726-58 Method A using a 6.5 $mm^2$ orifice. A value of greater than 10,000 sec/10 cc is assigned if the Gurley timer does not start 15 minutes after the start of the test.

Puncture Resistance:

Puncture resistance is a measurement of the peak load required to puncture a perimeter restrained film as in AS° FM F-1306-90. The specimen clamping fixture holds the sample by compression at the annular region between two circular plates. The plates provide a 12.7-mm diameter exposed section of film. The penetration probe is a cylindrical 2-mm diameter probe with a 1-mm radius tip. The penetration probe is advanced at a rate of 2 mm/s and the maximum load before the film puncture is recorded. Values are reported in grams per unit of film thickness.

Porosity:

Porosity is a value calculated from the measured bulk density and polymer density using the following equation:

$$\text{Porosity}=(1-\text{bulk density}/\text{polymer density})\times 100$$

The bulk density is determined by dividing the weight of a 47 mm diameter sample containing eight film layers with its thickness and accounting for its area conversion factor.

Tensile Strength:

Tensile strength at break is a value measured according to ASTM D 882-95a using an Instron™ model 1122 under the following conditions: jaw gap of 25 mm, jaw speed of 500 mm/min, and sample width of 25 mm.

Pore Size:

This value is the average pore diameter as determined by nitrogen sorption using, Quantachrome Autosorb™ Automated Gas Sorption System.

Example 1 and Comparative Example 1

Various microporous films were made to illustrate the effect of stretch ratios and order of process steps on puncture resistance.

In Example 1 and in Comparative Example 1, a normally melt-processable polymer component (high density polyethylene available under the trade designation of HYA-021 from Mobil Chemical Co.) with a melt flow index of 5.0 dg/min (ASTM D1238-90b, Condition F, HLMI) and a weight-average molecular weight of 226,900 was fed into the hopper of a 25 mm twin-screw extruder. A compound component, mineral oil (available under a trade designation Amoco White Mineral Oil #31) having a viscosity of 60 centistokes (ASTM D445-96 at 40° C.), was introduced into the extruder through an injection port at a rate to provide a composition of 45% by weight polymer component and 55% by weight compound component. The polymer and compound component were melt blended in the extruder, and the melt was fed into a coat-hanger die to form a sheet and cast on a cooled wheel to make a 305-micrometer thick film. Samples A–H of the cast film of Example 1 were first cut into 4.8-cm×4.8-cm squares and biaxially stretched, either sequentially or simultaneously, in ratios ranging from 4×4 to 7×7 (machine direction×cross-web direction) as shown in Table 1. Stretching was done at a rate of 20% per second while the film was at a temperature of 100° C. Following stretching, the samples were heat set under restraint for 30 seconds at 105° C. The samples were then washed under restraint in dichlorotrifluoroethane and dried.

The cast film of Comparative Example 1 was prepared in the same manner as the film of Example 1, except that it was washed under restraint in dichlorotrifluoroethane prior to stretching. Samples C1A–C1H then were cut and stretched in the same manner as the film in Example 1.

The cast film of Comparative Example C1I was prepared in the same manner as the film of Example 1. except that it was sequentially stretched 3×3.

The cast film of Comparative Example C1J was prepared in the same manner as the film of Comparative Example C1I, except that it was washed under restraint in dichlorotrifluoroethane prior to stretching and was heatset at 115° C. for 60 seconds.

The samples were tested for thickness, Gurley air flow, puncture resistance, porosity and tensile strength at break (MD/CD). All values are reported in the Table 1.

TABLE 1

| Sample | Stretch Ratio (MD × CD) | Thickness ($\mu$m) | Gurley (sec/ 10 cc) | Resistance (g/ 25 $\mu$m) | Porosity (%) | Tensile ($kg/cm^2$) |
|---|---|---|---|---|---|---|
| 1A | 4 × 4 seq | 25 | 602 | 417 | 35 | 850/— |
| 1B | 5 × 5 seq | 18 | 460 | 563 | 32 | 1201/1000 |
| 1C | 6 × 6 seq | 13 | 288 | 722 | 33 | —/1200 |
| 1D | 7 × 7 seq | 10 | 252 | 878 | 33 | —/1300 |
| 1E | 4 × 4 sim | 28 | 678 | 365 | 34 | —/720 |
| 1F | 5 × 5 sim | 20 | 567 | 488 | 33 | 960/— |
| 1G | 6 × 6 sim | 15 | 254 | 645 | 38 | 1000/1100 |
| 1H | 7 × 7 sim | 10 | 226 | 838 | 34 | 1500/1300 |
| C1A | 4 × 4 seq | 55 | 47 | 154 | 70 | 410/320 |
| C1B | 5 × 5 seq | 48 | 27 | 191 | 76 | 320/320 |
| C1C | 6 × 6 seq | 38 | 18 | 175 | 78 | 380/290 |
| C1D* | 7 × 7 seq | — | — | — | — | — |
| C1E | 4 × 4 sim | 35 | 92 | 288 | 57 | 490/480 |
| C1F | 5 × 5 sim | 28 | 74 | 332 | 63 | 550/470 |
| C1G | 6 × 6 sim | 21 | 61 | 347 | 62 | 670/580 |
| C1H* | 7 × 7 sim | — | — | — | — | — |
| C1I | 3 × 3 seq | 45 | 1060 | 248 | 36 | 650/500 |
| C1J | 3 × 3 seq | 50 | 165 | 228 | 50 | 450/430 |

*film samples broke while stretching.
"sim" refers to simultaneous stretching
"seq" refers to sequential stretching

Example 2

A microporous film was made to illustrate the effect of a different polymer component to blending compound ratio and to illustrate the effect of an unbalanced stretch ratio on film properties.

A high density polyethylene identical to that used in Example 1 was fed into a hopper of a 40 mm twin-screw extruder. Mineral oil was introduced into the extruder to provide a composition of 40% by weight polymer component and 60% by weight blending compound. The overall flow rate was 11.4 kg/hr, the mixture of polymer and blending compound was maintained at a temperature of 204° C. during the extrusion, the casting roll was maintained at 66° C. and the film was stretched 6×11 at 104° C. in the machine direction followed by 4.2×1 at 113 ° C. in the cross-web direction, followed by continuous washing in dichlorotrifluoroethane and drying.

The sample was tested for thickness, Gurley air flow, puncture resistance, porosity and pore size. Thickness was 30 μm, Gurley was 268 sec/10 cc, puncture resistance was 463 g/25 μm, porosity was 49% and pore size was 0.03 μm.

Example 3

A microporous film was made to illustrate the effect of a different type of polymer component on film properties and to illustrate a three layer extrusion technique.

The high density polyethylene used in Example 1 was fed into a hopper of a 40 mm twin-screw extruder. A blending compound component (White Mineral Oil #31) was introduced into the extruder to provide Composition A having a polymer to compound weight ratio of 35:65. A second melt-processable polymer component consisting of (1) polypropylene (available as DS 5D45 from Union Carbide) with a melt flow index of 0.65 dg/min (ASTM D1238-90b, Condition I) and (2) ethylene-hexene copolymer (available from Exxon Chemicals under the trade designation SLP 9057) with a melt flow index 1.2 dg/min (ASTM D1238-90b, Condition E) was dry blended in a weight ratio of 30:70 and fed into the hopper of a 25 mm twin-screw extruder. Mineral oil was introduced into the 25 mm extruder to provide Composition B having the same polymer to compound weight ratio of 35:65. A nucleating agent (Millad™ 3905 available from Miliken) in the amount of 0.1 parts per 100 parts Composition B was also added. The overall feed rate in the first extruder was 13.6 kg/hr and in the second was 6.8 kg/hr. In each extruder the polymer component was heated to 266° C. to melt it and the temperature was maintained at 204° C. during the extrusion after the polymer component was mixed with the blending compound. The melt streams from both extruders were combined in a triple manifold die to form a layer of Composition A sandwiched between two layers of Composition B. The three layer film was cast onto a casting wheel maintained at 77° C. and having a patterned surface with an inverted pyramid shape that provided about 40% contact area with a cast film. The cast film was oriented 6.5 to 1 in the machine direction at 82° C., then 4 to 1 in the cross direction at 82° C. The oriented film was then continuously washed in dichlorotrifluoroethane.

The resulting film was tested for thickness, Gurley air flow and puncture resistance. Thickness was 20 μm, Gurley was 510 sec/10 cc and puncture resistance was 454 g/25 μm.

Example 4

A microporous film was made to illustrate the effect of a different quenching method.

The microporous film of Example 4 was made in a manner similar to that of Example 2 except the polymer component was different and some equipment and processing conditions were changed. The melt-processable polymer component was DS5D45 polypropylene. Thc flow rates were adjusted to obtain a weight ratio of polymer component to blending compound of 35:65. A nucleating agent (Millad™ 3905) in the amount of 0.09 parts per 100 parts composition was also added to the extruder. The die was 24.1 mm wide and a water bath maintained at 16° C. was used to quench the cast film instead of a chill roll. The overall feed rate was 22.7 kg/hr, the extruder was heated to 266° C. to melt the polymer component and maintained at 188° C. while the components were mixed. The machine direction orientation was 5×1 at 121° C. and the cross-web orientation was 4.7×1 at 121° C.

The film was tested for thickness, Gurley air flow, puncture resistance, porosity and tensile strength at break (MD/CD). Thickness was 13 μm, Gurley was 247 sec/10 cc, puncture resistance was 635 g/25 μm, porosity was 45% and tensile strength at break in the machine and cross-web directions was 882 and 622 kg/cm$^2$ respectively.

Example 5

A microporous film was made to illustrate the effect of a different type of polymer component and blending compound on film properties.

The microporous film of Example 5 was made in a manner similar to that of Example 1 except some materials and equipment were different and the process conditions were changed. The polymer component was composed of a 30:70 by weight blend of two melt processable polymers, polypropylene (DS5D45) and ethylene-hexene copolymer (available under the trade name of SLP 9057 from Exxon Chemicals Co.) with a melt flow index 1.2 dg/min (ASTM D1238-90B, Condition E). The flow rates were adjusted to obtain a weight ratio of polymer component to blending compound of 40:60. A nucleating agent (Millad™ 3905) in the amount of 0.1 parts per 100 parts composition also was added to the extruder. The die was 20.3 mm wide and the chill roll had a patterned surface with a pyramid shape that provided about 10% contact area with the cast film. The overall feed rate was 4.5 kg/hr, the melting temperature was 271° C., the mixing temperature was 193° C., the chill roll temperature was 65° C. and the stretch conditions were 7×7 simultaneously at 90° C.

The resulting film was tested for thickness, Gurley air flow and puncture resistance. Thickness was 11 μm, Gurley was 802 sec/10 cc and puncture resistance was 687 g/25 μm.

Example 6

A microporous film was made to illustrate the effect of another polymer and blending compound type on film properties.

The microporous film of Example 6 was made in a manner similar to that of Example 5 except some materials were different and the process conditions were changed. The normally melt processable polymer component was linear low density polyethylene (available under the trade designation Dowlex™ 2038) with a melt flow index of 1.0 dg/min (ASTM D1238-90b, Condition I) and no nucleating agent was used. The film was stretched while at a temperature of 110° C.

The resulting film was tested for thickness, Gurley air flow and puncture resistance. Thickness was 10 μm, Gurley was 425 sec/10 cc and puncture resistance was 435 g/25 μm.

Example 7

A microporous film was made to illustrate a liquid/liquid phase separation mechanism.

The microporous film of Example 7 was made in a manner similar to that of Example 5 except some materials were different and the process conditions were changed. The polymer component was composed of a 60:40 by weight blend of two melt processable polymers, polypropylene (DS5D45) and ethylene-hexene copolymer (SLP 9057). The compatible liquid was composed of a 70:30 by weight mixture of mineral oil and PEG 400 dilaurate. The flow rates were adjusted to obtain a weight ratio of polymer component to compatible liquid of 30:70. The film was stretched 5 by 5 simultaneously while at a temperature of 90° C. and washed under restraint in dichlorotrifluoroethane and dried.

The resulting film was tested for thickness, Gurley air flow and puncture resistance. Thickness was 8 $\mu$m, Gurley was 218 sec/10 cc and puncture resistance was 473 g/25 $\mu$m.

We claim:

1. A method of making microporous material, comprising:

(a) melt blending to form a substantially homogeneous mixture comprising:

(i) from about 25 to about 60 parts by weight of a melt-processable semi-crystalline thermoplastic polymer component; and (ii) from about 40 to about 75 parts by weight of a second component comprising either (1) a compound that is miscible with the thermoplastic polymer component at a temperature above the melting temperature of the thermoplastic polymer but the phase separates from the thermoplastic polymer component when cooled below the crystallization temperature of the thermoplastic polymer component or (2) a compatible liquid that is miscible with the thermoplastic polymer component at a temperature above the liquid-liquid phase separation temperature but that phase separates from the thermoplastic polymer component when cooled;

(b) forming shaped material of the melt blended mixture;

(c) cooling the shaped material to a temperature at which phase separation occurs between the compound or compatible liquid and the thermoplastic polymer component through crystallization precipitation of the thermoplastic polymer component; and (d) stretching the shaped material in at least two perpendicular directions to an area expansion ratio of greater than nine and provide a network of interconnected pores;

(e) then removing the compound to provide a microporous material having a puncture resistance of at least 350 g/25 microns;

wherein said melt-processable thermoplastic polymer component is selected from the group consisting of polypropylene, ethylene vinyl alcohol copolymer, poly (ethylene chlorotrifluoroethylene), polyvinylidene fluoride, polymethylpentane poly(vinyl fluoride), polyoxymethylene, poly(ethylene oxide), and compatible blends thereof.

2. The process of claim 1 wherein the shaped material is stretched in each direction to an expansion ratio of least 15.

3. The process of claim 1 wherein the shaped material is stretched in each direction to an expansion ratio of least 25.

4. The process of claim 1 wherein the melt-processable, semi-crystalline thermoplastic polymer component has a melting temperature greater than 140° C.

5. The process of claim 1 wherein the second component is selected from the group consisting of mineral oil, mineral spirits, dioctylphthalate, dodecyl alcohol, hexadecyl alcohol, octadecyl alcohol, dicyclohexylphthalate, triphenyl phosphate, paraffin wax, liquid paraffin, stearyl alcohol, o-dichlorobenzene, trichlorobenzene, dibutyl sebacate, and dibenzyl ether.

6. The process of claim 1 wherein the second component further comprises one or more surfactants.

7. The process of claim 1 wherein the second component further comprises one or more nucleating agents.

8. The process of claim 1 wherein the melt-processable, semi-crystalline thermoplastic polymer component is polypropylene and compatible blends thereof.

9. The process of claim 1 wherein said compatible polyolefin blend selected from the group consisting of polypropylene and ethylene propylene rubber; polypropylene and ethylene alpha-olefin copolymers; and polypropylene and polybutylene.

10. The process of claim 1 wherein the melt-processable, semi-crystalline thermoplastic polymer component is selected from the group consisting of:

ethylene vinylalcohol copolymer having a melt flow index above 0.5 dg/min;

polypropylene having a melt flow index above 0.2 dg/min;

poly (ethylene chlorotrifluoroethylene) having a melt flow index above 1.0 dg/min;

polyvinylidene fluoride having a melt flow index above 0.2 dg/min; and polymethylpentane having a melt flow index above 5 dg/min.

11. The method of claim 1, wherein the microporous material has a puncture resistance of at least 500 g/25 microns.

12. The method of claim 1 wherein said shaped material is stretched at a temperature between the alpha crystallization temperature and the melting point of the thermoplastic polymer.

13. A microporous material comprising a melt-processable thermoplastic polymer component wherein the semi-crystalline thermoplastic polymer component is miscible in a compound or compatible liquid when heated above the melting temperature of the thermoplastic polymer or the liquid-liquid phase separation temperature and phase separates from the compound or compatible liquid when cooled, wherein the material is stretched in at least two perpendicular directions to an area expansion ratio of greater than nine, and wherein the material has a puncture resistance of at least 350 g/25 microns;

wherein said melt-processable thermoplastic polymer component is selected from the group consisting of polypropylene, ethylene vinyl alcohol copolymer, poly (ethylene chlorotrifluoroethylene), polyvinylidene fluoride, polymethylpentane poly(vinyl fluoride), polyoxymethylene, poly(ethylene oxide), and compatible blends thereof.

14. The microporous material of claim 13 wherein the material is stretched in each direction to an expansion ratio of least 15.

15. The microporous material of claim 13 wherein the material is stretched in each direction to an expansion ratio of least 25.

16. The microporous material of claim 13 wherein the melt-processable, semi-crystalline thermoplastic polymer component has a melting temperature greater than 140° C.

17. The microporous material of claim 13 wherein the compound or compatible liquid is selected from the group of consisting of mineral oil, mineral spirits, dioctylphthalate, dodecyl alcohol, hexadecyl alcohol, octadecyl alcohol, dicyclohexylphthalate, triphenyl phosphate, paraffin wax, liquid paraffin, stearyl alcohol, o-dichlorobenzene, trichlorobenzene, dibutyl sebacate, and dibenzyl ether.

18. The microporous material of claim 13 further comprising one or more additional adjuvants selected from the group consisting of anti-static materials, one or more surfactants, dyes, plasticizers, UV absorbers, nucleating agents, and anti-oxidants.

19. A microporous film comprising the microporous material of claim 13.

20. A multi-layer microporous material comprising the microporous film of claim 19.

21. A multi-layer microporous film comprising a first layer comprising a porous film, a second layer disposed on one side of the first layer comprising the microporous film of claim 19, and a third layer disposed one side of the second layer comprising a porous film.

22. A battery separator comprising a film made of the microporous material of claim 1.

23. The microporous material of claim 13 comprising extended chain crystals of the thermoplastic polymer.

* * * * *

UNITED STATES PATENT AND TRADEMARK OFFICE

CERTIFICATE OF CORRECTION

PATENT NO. : 6,096,213
DATED : August 1, 2000
INVENTOR(S) : Radovanovic et al.

It is certified that error appears in the above-identified patent and that said Letters Patent is hereby corrected as shown below:

Column 9,
Lines 28 & 29 "AS°FM F-1306-90" should read -- ASTM F-1306-90 --.

Column 10,
Line 13, "machine directionxcross-web direction" should read -- machine direction x cross-web direction --.

Column 11,
Line 7, "6x11" should read -- 6x1 --.
Line 8, "113 ° C." should read -- 113° C. --.

Signed and Sealed this

Eleventh Day of December, 2001

*Attest:*

NICHOLAS P. GODICI

*Attesting Officer*

*Acting Director of the United States Patent and Trademark Office*